United States Patent

[11] 3,542,379

[72] Inventor George V. Woodling
 22077 W. Lake Road, Rocky River, Ohio 44116
[21] Appl. No. 734,669
[22] Filed June 5, 1968
[45] Patented Nov. 24, 1970

[54] SHAFT SEAL MEANS
 13 Claims, 6 Drawing Figs.
[52] U.S. Cl. ................................................ 277/172, 277/207
[51] Int. Cl. ................................................ F16j 9/00; F16k 41/00
[50] Field of Search .......................................... 277/172, 37, 171, 58, 168, 170, 174, 173, 206.1, 207

[56] References Cited
UNITED STATES PATENTS

| | | | |
|---|---|---|---|
| 3,088,442 | 5/1963 | Self et al. ...................... | 277/173X |
| 3,184,247 | 5/1965 | Leutwyler ...................... | 277/170 |
| 3,421,412 | 1/1969 | Ackley ........................... | 277/95 |

Primary Examiner—Samuel Rothberg
Attorney—Woodling, Krost, Granger and Rust

ABSTRACT: A fluid seal for a shaft mounted in an annular groove surrounding the shaft. The fluid seal comprises an O-ring of rubberlike material having substantially a square cross section with four raised crown corners. Three of the crown corners sealingly engage the groove with only one sealingly engaging the shaft which reduces the friction and the resultant amount of heat generated.

Patented Nov. 24, 1970 3,542,379

INVENTOR.
BY GEORGE V. WOODLING
Woodling, Krost, Granger and Rust,
attys.

3,542,379

SHAFT SEAL MEANS

My invention relates in general to shaft fluid seals and more particularly to rotating shaft seals.

Although my invention is particularly useful for rotating shaft seals, it is not necessarily limited thereto, because is it may also be used for reciprocating shaft seals or in other situations.

Most elastomers, such as rubberlike O-rings, when heated in a stretched or stressed (garterlike) condition, will contract. This contraction (shrinkage) is damaging because it results in a tendency for the O-ring to squeeze all the harder against the rotating shaft, which self-perpetuates more heat. Continued rotation of the shaft tends to cause the O-ring to seize the shaft, whereupon more friction will cause more heat and the process becomes self-perpetuating until the O-ring is destroyed. This phenomenon is known as the GOW-JOULE effect.

An object of my invention is to resist heat shrinkage of an O-ring about a shaft.

Another object is to minimize the phenomenon, known as the GOW-JOULE effect.

Another object is to provide a narrow axial contact engagement between the O-ring and the shaft.

Another object is the provision of mounting an O-ring in an inclined groove extending outwardly from the shaft bore.

Another object is to withdraw the O-ring from the shaft as it is compressed by fluid pressure into the inclined groove.

Another object is to withdraw the O-ring from the shaft at a slower rate than it is compressed into the groove.

Another object is the provision of an inclined groove having a sidewall overlaying a portion of the O-ring.

Another object is the provision of an inclined groove having a sidewall, defining with the shaft bore, an annular apex pointing in a direction opposite to that at which the fluid pressure is applied to the O-ring.

Another object is the provision of a takeup apex void at the terminal end of the annular apex, whereby the O-ring is required to fill up the takeup apex void before it can start to extrude between the shaft and the bore.

Another object is the provision of an inclined groove which accommodates either the "round" type of O-ring in cross section or the "square" type of O-ring in cross section.

Another object is a shaft seal having a large cushion effect and a small frictional contact with the shaft.

Another object is the provision of an inclined groove for an O-ring which does not necessarily require close machining tolerances.

Other objects and a fuller understanding of this invention may be had by referring to the following description and claims, taken in conjunction with the accompanying drawings, in which:

Figure 1:
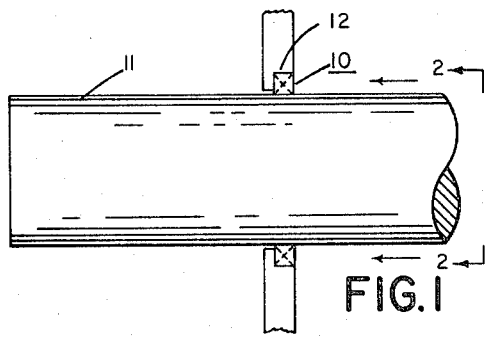
FIG. 1 is a view, diagrammatically illustrating the position in which my shaft seal may be mounted between a shaft and a cylindrical surface counterbore confronting and spaced outwardly from the shaft.
Figure 2:
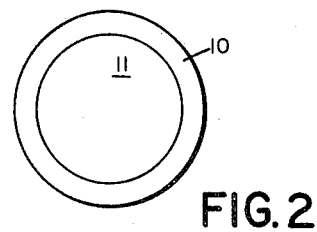
FIG. 2 is an end view of the shaft seal only of FIG. 1 looking in the direction of the line 2-2.

In FIGS. 1 and 2, my shaft seal (diagrammatically illustrated) is identified by the reference character 10, and is disposed to be mounted between a shaft 11 and a counterbore 12 provided in a flange or wall of a fluid pressure device through which the shaft extends. The shaft seal is responsive to fluid, under pressure in the fluid pressure device, and the direction at which the pressure is applied against the shaft seal is indicated by the arrows in FIG. 1.

Figures 3, 5:
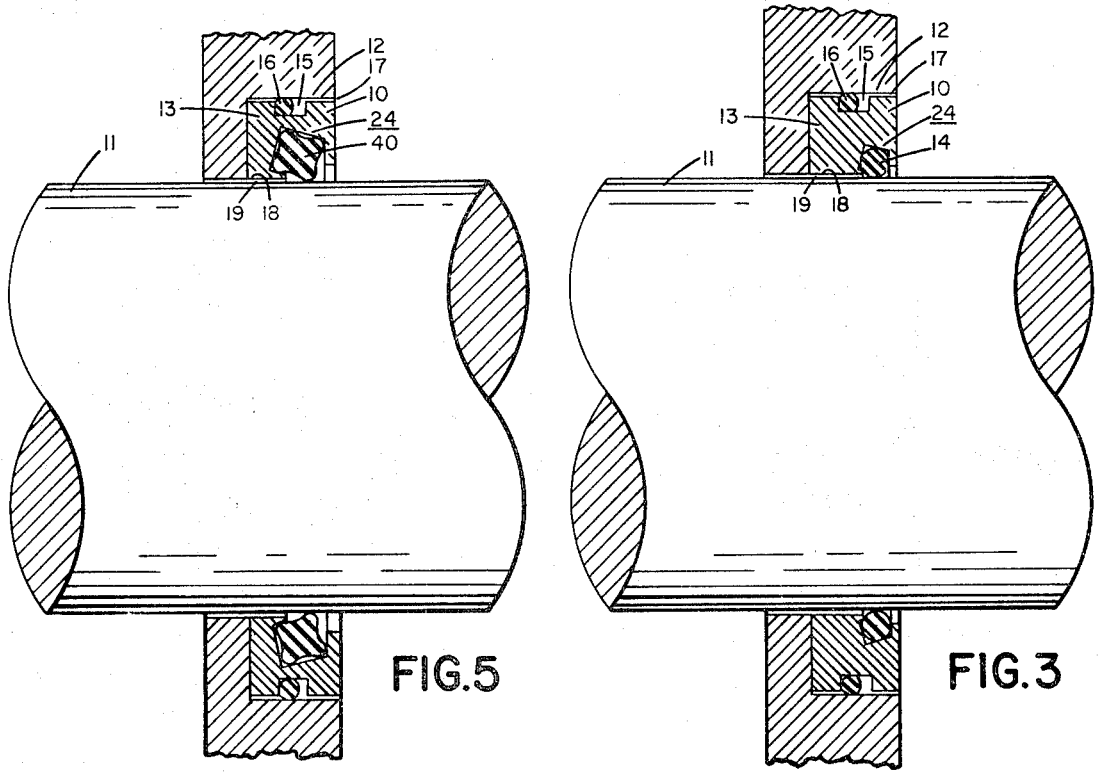
FIG. 3 is an enlarged i diametrical, cross-sectional view of a shaft seal (drawn to substantially three-times scale for a 1" shaft) embodying the features of my invention and showing an O-ring having substantially a round cross section.
FIG. 5 is a view similar to FIG. 3, but showing a square-section O-ring.

As shown in FIG. 3, my shaft seal assembly comprises a continuous annular body 13 surrounding the shaft 11, and a continuous annular O-ring 14 (round cross section) for effecting a fluid seal between the shaft and the surrounding body. The annular body 13 is preferably made of metal and may be sealingly pressed into the counterbore 12. To this end, the outer cylindrical surface of the surrounding body 13 is provided with an external annular groove 15 for receiving an O-ring 16 which makes a sealing engagement between the annular body 13 and the counterbore 12. The O-rings 14 and 16 are preferably composed of rubberlike material, commercially available in various formulations and hardness. For ease in co mounting, the diametrical clearance 17 between the annular body and the counterbore may reside (depending upon the fluid pressure) in a range from approximately .002 to .008 inch, whereby the O-ring 16 may act as a cushion, within the limits of the diametrical clearance, to accommodate for axial eccentricity of the shaft 11. With this cushion effect, the shaft sealing O-ring 14 is substantially free from being subjected to a side thrust due to eccentricity.

As shown in FIG. 3, the surrounding annular body 13 has a shaft bore 18 through which the shaft 11 extends. The diametrical shaft clearance 19 between the shaft bore 18 and the shaft 11 may reside (depending upon the fluid pressure) in a range from approximately .004 to .012 inch, being kept as small as possible to prevent the extrusion of the O-ring 14 along the shaft 11.

Figure 4:
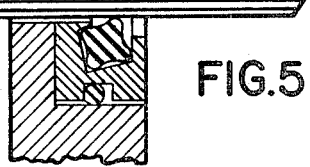
FIG. 4 is an enlarged fragmentary view of FIG . 3, showing the relationship of the round-section O-ring with the inclined groove and the shaft.

The shaft seal O-ring 14 is disposed to be mounted in an inclined groove 24 extending outwardly from the shaft bore 18. As illustrated in FIG. 4, the inclined groove 24 is defined by first and second opposed sidewalls 25 and 26 and a bottom wall 27, with the shaft sealing O-ring 14 sealingly compressed between the shaft 11 and the inclined groove 24. The first and second opposed sidewalls 25 and 26 respectively extend in the same general direction and respectively are disposed at an acute angle to the axis of the shaft bore. The first sidewall 25, which is the short side, axially overlays a portion of the sealing O-ring 14 and the second sidewall 26, which is the long side, axially confronts the rotating shaft 11. The second sidewall 26 terminates into an abutment end wall 23 for holding the O-ring into the groove.

The included angle of the groove 24 with respect to the shaft bore is preferably about 15° and may reside in a range from approximately 10 to 30°. The inclined groove is easily machinable and does not necessarily require close machining tolerances.

The first sidewall 25 and the shaft bore 18 define a substantially annular apex 28 which points in a direction opposite to that at which the fluid pressure is applied to the sealing O-ring 14. The annular apex 28 has an annular terminating end wall 29 facing in a direction opposite to which fluid pressure is applied to the sealing O-ring 14. The terminating end wall 29 provides an apex takeup void 30 between the sealing O-ring 14 and the shaft 11, whereby the O-ring 14 is required to fill up the apex takeup void 30 before it can start to extrude between the shaft and the bore. The width of the inclined groove 24 between the opposing sidewalls 25 and 26 is preferably slightly less that than the width of the sealing O-ring to provide a compression side squeeze on the O-ring. The walls of the inclined groove are disposed to support the O-ring 14 in the groove with the O-ring making a five-point engagement (annular surface portion) with the groove and the shaft. The sealing engagement (annular surface portion) of the O-ring 14 with the shaft is at 31 and the sealing engagement with the groove is at 32, 33, 34 and 35. In this supported position of the O-ring 14, the shaft engagement at 31 is in advance of the annular apex 28; the groove engagement at 32 is against the first sidewall 25; the groove engagement at 33 is against the bottom wall 27; the groove engagement 34 is against the second side 26; and the groove engagement 35 is against the abutment end wall 23. The groove engagements 32 and 34 are substantially diametrically opposite each other and the shaft engagement 31 is substantially diametrically opposite the center of the O-ring 14. As fluid pressure increases, the O-ring 14 is compressed down into the inclined groove, filling up the corner takeup voids 36 and 37. This downward movement of the O-ring 14 functions to withdraw the shaft engagement at 31 radially away from the shaft. Consequently, the more the fluid pressure the less the friction area at the shaft engagement 31, resulting in less heat. With a 15° inclined groove, a downward movement (one unit) of the center of the O-ring 14 will tend to withdraw O-ring 14 from the shaft in a radial direction at the shaft engagement 31, a distance of approximately .250 unit, whereby the withdrawal movement is about one-fourth the compression movement of the O-ring into the inclined groove. Thus, fluid pressure which is considered to be a disadvantage is converted into an advantage. As a result, my shaft seal will withstand high fluid pressures, and since the friction area is small, it will also withstand high rotating shaft speeds. It is also to be noted that, since the first sidewall 25 axially overlays a portion of the O-ring 14, it is prevented from seizing the shaft. Thus, the GOW-JOULE effect is impeded or minimized, which prolongs the life of the O-ring. There is another advantage derived from my inclined groove, and that is, as the O-ring 14 is compressed by fluid pressure into the bottom of the groove, the O-ring material in the vicinity of the apex takeup void 30 is caused to flow toward the corner takeup voids 36 and 37, and as a result there is little tendency for the O-ring material to fill up the apex takeup void 30 until the corner takeup voids 36 and 37 are filled up. Any tendency for the O-ring 14 to extrude between the shaft and the shaft bore 18 is delayed.

For a rotating shaft seal, experience teaches that it is desireable to use the O-ring with the smallest cross-sectional diameter, available for the size of the shaft required. Thus, for rotary shaft seals, the larger cross-sectional diameter O-rings are generally not used. Usually, the three smallest commercially available cross-sectional diameters are used; namely, .070 inch, .103 inch and .139 inch, depending upon the shaft speed, measured in feet per minute. For low speeds below 200 feet per minute, the cross-sectional diameter is usually not critical. For speeds between 200 to 400 feet per minute, the .139-inch diameter is preferable; between 200 to 600 feet per minute, the .103-inch diameter is recommended, and between 200 to 1,500 feet per minute, the .070-inch diameter is essential. The purpose of using the smaller cross-sectional diameter O-rings is to keep the area of axial contact which the O-ring makes with the shaft as small as possible to reduce friction and the resultant heat generated. For a given amount of squeeze (pressure of O-ring against the shaft) the area of axial contact is a function of the radius of curvature of the O-ring. For example, the smaller the radius of curvature, the smaller the area of axial contact, assuming all other factors being equal.

Beside the radius of curvature, there is another dimensional factor which affects the area of axial contact; namely, the radial thickness of the O-ring. The larger the radial thickness of the O-ring, the less the requirement of accurate machining of the O-ring groove. Thus, for example, a machine tolerance of .003 inch where the O-ring engages the second sidewall 26 of the machined groove will not necessarily reflect the same variation where the O-ring engages the shaft, because with a thick O-ring (radial dimension) some of the machine tolerance has an opportunity of being absorbed (cushion effect) before it reaches the shaft. Thus, a round cross section O-ring has conflicting characteristics; in that, when a small cross section is used to reduce the width of the frictional engagement with the shaft, the radial thickness, of necessity, is small and this precludes the cushion effect which is desirable to absorb machine tolerances before it reaches the shaft. The conflicting characteristics may be overcome in FIGS. 5 and 6 where a square-section O-ring 40 is mounted in my inclined groove instead of a round-section O-ring. The square-section O-ring 40 (usually referred to as a "Quad-ring") has the distinction, when mounted in my inclined groove, of providing a small radius of curvature in contact with the shaft and at the same time of providing a thick radial dimension between the second sidewall 26 of the machined groove and the shaft. Thus, with a square-section O-ring, the inclined groove does not necessarily require close machining tolerances.

Figure 6:
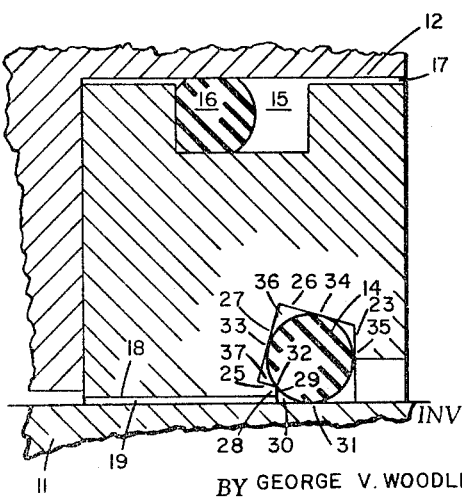
FIG. 6 is an enlarged fragmentary view of FIG. 5, showing the relationship of the square-section O-ring with the inclined groove and shaft.

As illustrated in FIG. 6, the square-section O-ring 40, preferably composed of rubberlike material, has four crown corners and they make a sealing engagement (annular surface portion) with the shaft at 45 and with the inclined groove at 46, 47 (both crown corners), 48 (both crown corners) and 49. Thus, the square-section O-ring 40 has at least five annular surface portions sealingly engaging the shaft and the inclined groove. The frictional contact at 45 with the shaft is relatively small and thus the friction is small relative to that for a round-section O-ring. In FIGS. 3 and 4, the round-section O-ring, in order to provide a minimum of friction, may have a cross-sectional diameter of approximately .070 inch, or a radius of curvature of approximately .035 inch. The crown corners for the square-section O-ring may have a radius of curvature of approximately .025 inch and a distance of approximately .090 inch and a distance between the centers of the crown corners. A comparison indicates that the square-section O-ring has less shaft friction than the round-section O-ring and has approximately twice the radial dimension (cushion effect) between the second side 26 of the groove and the shaft. Under most operating conditions, whatever the round section O-ring can do, the square-section O-ring in my inclined groove can do better.

The square-section O-ring in the vicinity of the apex-take void 30 is naturally formed inwardly, whereby there is less tendency for the square-section O-ring to extrude between the shaft and the shaft bore. The operation of the square-section O-ring follows generally the operation of the round-section O-ring, except for the differences pointed out above. The square-section O-ring 40, as it is compressed down in the inclined groove, is radially drawn away from the shaft to reduce the friction the same as the round-section O-ring is drawn away from the shaft.

Although this invention has been described in its preferred form with a certain degree of particularlity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. Seal means including continuous annular sealing ring means for effecting a fluid seal between a shaft and a surrounding body, said body having a shaft bore through which said shaft extends, said body having a groove extending outwardly from said shaft bore and disposed to receive said sealing ring means, said sealing ring means comprising an O-ring of rubberlike material having at least an annular surface provided with first and second raised crown sealing portions spaced apart from each and including a valley portion therebetween, said first and second crown sealing portions facing in a direction toward said shaft with said first crown sealing portion sealingly engaging said shaft, and holding means for holding said second crown portion from engaging said shaft.

2. The structure of claim 1, wherein said holding means comprises groove wall means overlying said second crown portion.

3. The structure of claim 1, wherein said O-ring has substantially a square cross section, and wherein said groove has first and second opposed sidewall means and bottom wall means therebetween.

4. The structure of claim 3, wherein said bottom wall means is disposed at an acute angle with respect to the axis of said shaft bore.

5. The structure of claim 3, wherein said first sidewall means constitutes a said holding means and has a length less that than that of said second sidewall means.

6. The structure of claim 5, wherein said first sidewall means and said shaft bore define substantially an annular apex.

7. The structure of claim 6, wherein said apex points in a direction opposite to that at which the fluid pressure is applied to said sealing ring means.

8. The structure of claim 7, wherein said apex has an annular terminating end wall means facing in a direction opposite to that at which the fluid pressure is applied to said sealing ring means.

9. The structure of claim 8, wherein said annular terminating end wall means provides an apex takeup void between said sealing ring means and said shaft.

10. The structure of claim 3, wherein said bottom wall means is disposed substantially perpendicular to said first sidewall means.

11. The structure of claim 3, wherein said O-ring has first, second, third and fourth crown corners, with said first crown corner sealingly engaging said shaft and with said second, third and fourth crown corners sealingly engaging said groove.

12. The structure of claim 3, wherein said sealing ring means withdraws in a radial direction from said shaft upon a compression movement thereof in said groove toward said bottom wall means.

13. The structure of claim 12, wherein said radial withdrawal movement is less than said compression movement toward said bottom wall means.